P. B. DELANY.
Automatic Telegraph.

No. 165,156.  Patented July 6, 1875.

Witnesses:
L. V. Royce.
J. H. Denham.

Inventor:
Patrick B. Delany
by Fred W. Royce
Attorney

N. PETERS, PHOTO-LITHOGRAPHER, WASHINGTON, D. C.

UNITED STATES PATENT OFFICE.

PATRICK B. DELANY, OF JERSEY CITY, NEW JERSEY.

IMPROVEMENT IN AUTOMATIC TELEGRAPHS.

Specification forming part of Letters Patent No. 165,156, dated July 6, 1875; application filed October 21, 1874.

*To all whom it may concern:*

Be it known that I, PATRICK B. DELANY, of Jersey City, in the county of Hudson and State of New Jersey, have invented certain new and useful Improvements in Automatic Telegraphy; and I do hereby declare the following to be a full, clear, and exact description of the invention, such as will enable others skilled in the art to which it pertains to make and use it, reference being had to the accompanying drawings, which form part of this specification.

It is well known that in rapid automatic telegraphy a great difficulty is experienced in false records or signals caused by an extra or induced current in the line itself. When the makes and breaks of the regular transmitting current are made with great rapidity, this current occupies the line during the period devoted to "spaces," causing tailings or blurs.

My invention has for its object the remedying of this; and to this end it consists in the combination in a local circuit, with an automatic transmitter using perforated paper, of a relay, which in one condition throws the current of the main battery upon the line, and in the other condition closes an earth connection, for readily discharging the line of the extra or induced current referred to, or closes the circuit to the line of a reversed battery for neutralizing the same.

In order that those skilled in the art may be enabled to make and use my invention, I will describe it in detail, reference being had to the accompanying drawings forming part of this specification, in which—

Figure 1:
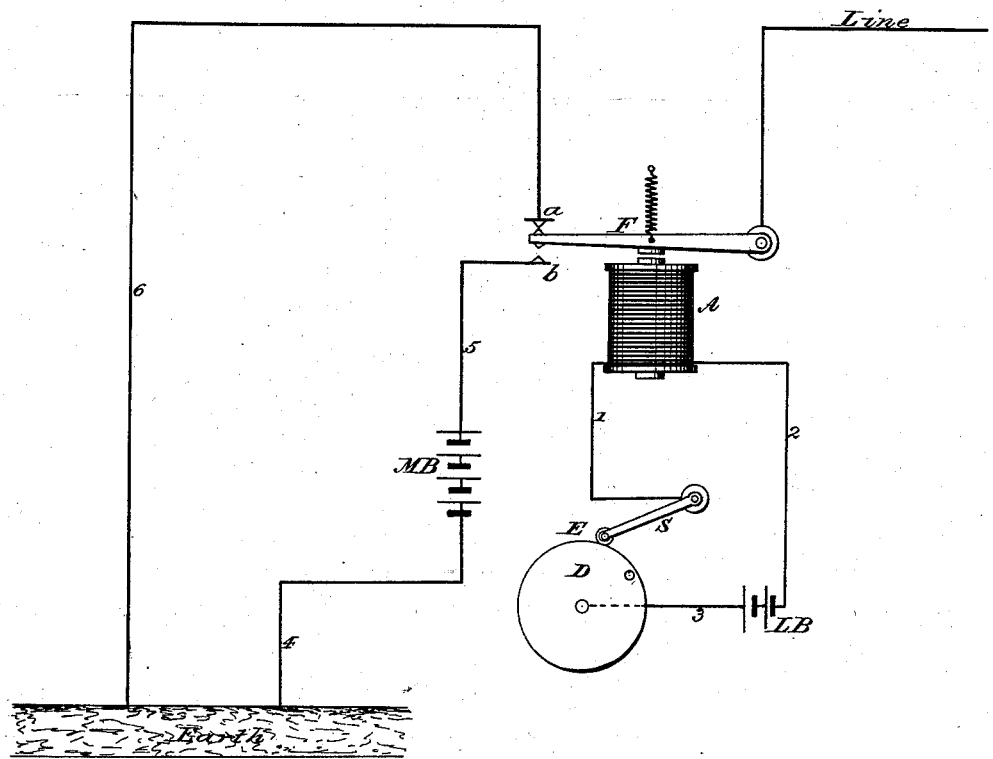
Figure 2:
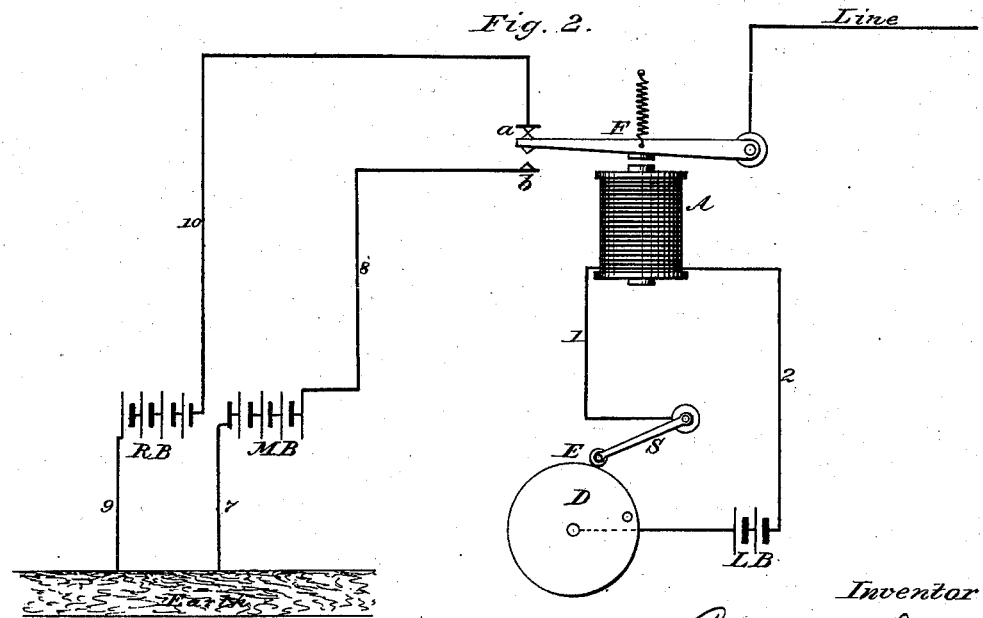

Figure 1 is a diagram showing the arrangement of the transmitter, relay, and main-line connections to main-line battery and to earth; and Fig. 2, the same elements with line-connections to main-line and reversing battery.

In both figures, E represents an automatic transmitter of any of the well-known forms, having drum D and stylus $s$, between which the perforated paper is fed. L B is a local battery, whose circuit is controlled by this transmitter. In the circuit 1 2 3 thereof is placed the relay-magnet A, with armature-lever F, to which the main line is connected. This lever F plays between contact-points $a\ b$. In Fig. 1 the contact $b$ is connected to the main-line battery M B by wire 5, the battery having the regular ground 4. To the contact $a$ a ground connection, 6, is made.

The relays are made and adjusted to work freely and quickly. The paper being fed through E, as the stylus falls upon drum D through a perforation, the circuit is closed through A drawing its armature down and closing the circuit of M B to the line. As the stylus is lifted from the drum by the unperforated paper and the circuit broken, the lever flies back, closing the earth circuit 6 for the line, allowing the line to discharge, and thus obviating any tailing or blur at the receiving-station.

In Fig. 2 a battery is shown connected to the line oppositely to the signaling or regular main battery. In this case, as the circuit of the main-line battery is broken, the reverse current is thrown upon the line through the contact $a$. This current neutralizes the extra or induced current, so that tailings or blurs are obviated.

Having thus described my invention, what I claim, and desire to secure by Letters Patent, is—

The combination, with an automatic transmitter, of a relay which connects the line on one movement of its armature to the signaling-battery, and upon the other to the earth or to a reversing-battery, substantially as and for the purposes set forth.

In testimony that I claim the foregoing, I have hereunto set my hand this 15th day of October, 1874.

PATRICK B. DELANY.

Witnesses:
H. H. WELLS,
JOHN BULL.